Aug. 2, 1927.

P. W. WILLANS 1,637,977

THERMIONIC VALVE CIRCUITS

Filed Oct. 27, 1926

Inventor
Peter William Willans
By B. Singer, Atty.

Patented Aug. 2, 1927.

1,637,977

UNITED STATES PATENT OFFICE.

PETER WILLIAM WILLANS, OF PATTISHALL, TOWCESTER, ENGLAND.

THERMIONIC VALVE CIRCUITS.

Application filed October 27, 1926, Serial No. 144,554, and in Great Britain July 2, 1925.

This invention relates to thermionic valve circuits in which means are embodied for neutralizing the capacity coupling between the elements of an amplifier.

It is well known in an amplifier in which inductances are respectively connected in the plate and grid circuits of a thermionic valve to neutralize the capacitative coupling between the two circuits by coupling an auxiliary inductance closely to either of the said inductances and connecting said auxiliary inductance through a condenser to the other of said inductances.

This arrangement however has the disadvantage that the capacity of the said condenser is added to the capacity in either the plate or the grid circuit and therefore unless said condenser is made very small the said circuit will become loaded with excessive capacity.

In accordance with the present invention I employ coupled respectively to said inductances—preferably as closely as possible—two auxiliary inductances connected together through a condenser or condensers so as to form a closed circuit. These auxiliary inductances are preferably of fewer turns than said inductances to which they are coupled. The capacity connecting them may then be made large in comparison with the capacity it is desired to neutralize. This is of course advantageous from the point of view of production.

Figure 1:
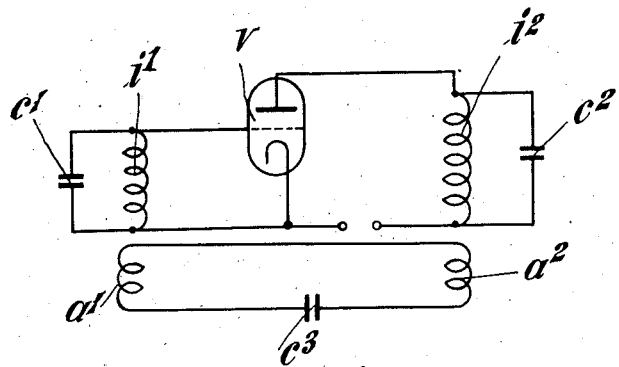
Figure 2:
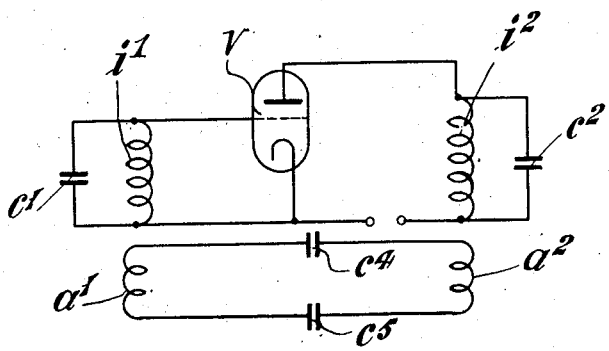
Figure 3:
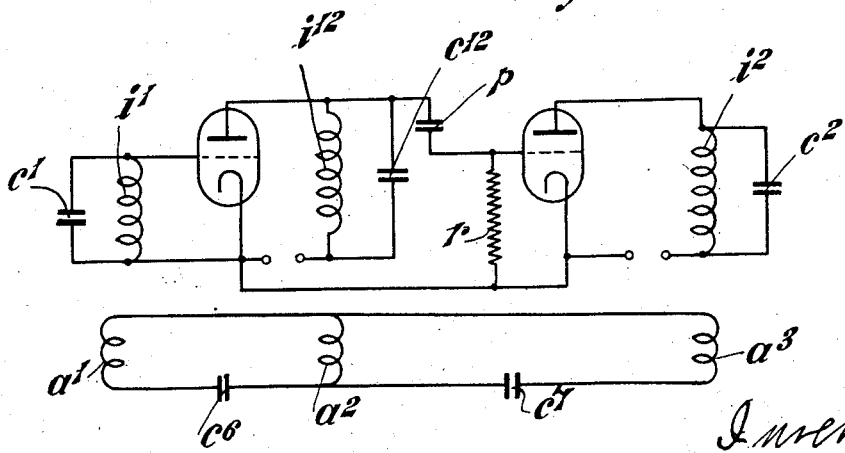

Each of Figs. 1 and 2 of the accompanying drawings illustrates diagrammatically the application of the invention to a single stage amplifier. Fig. 3 illustrates the application of said invention to a multi-stage amplifier comprising an interstage inductance which is connected in the plate circuit of one valve and the grid circuit of the next.

Referring first to Figures 1 and 2 each illustrates a valve $v$, one oscillatory circuit (consisting of an inductance $i^1$ in parallel with a condenser $c^1$) connected in the grid circuit of the valve, and another oscillatory circuit (consisting of an inductance $i^2$ in parallel with a condenser $c^2$) connected in the plate circuit and the valve.

These two figures also each illustrate two auxiliary inductances $a^1$ and $a^2$ respectively coupled with the inductances $i^1$ and $i^2$ and connected together through a capacity so as to form a closed circuit. In Fig. 1 it consists of a single condenser $c^3$. In Fig. 2 it consists of two condensers $c^4$ and $c^5$ connected in circuit alternately with the auxiliary inductances.

The values of the several capacities and inductances are selected for neutralization of the capacitative coupling between the elements. That is to say, for close coupling, if $$\frac{\text{turns in } i^1}{\text{turns in } a^1} = n^1 \text{ and } \frac{\text{turns in } i^2}{\text{turns in } a^2} = n^2$$

and if the valve capacity $= c\,v$ and the total capacity in circuit $a^1$, $a^2 = Cn$ then for neutralization $$\frac{Cn}{Cv} = n^1 \times n^2$$

Therefore if $$n_1 = n_2 = n, \quad \frac{Cn}{Cv} = n^2$$

Referring to Fig. 3, the multi-stage amplifier therein illustrated comprises two valves $v^1$ and $v^2$. The valve $v^1$ has an oscillatory circuit (consisting of an inductance $i^1$ in parallel with a condenser $c^1$) connected in the grid circuit thereof and the valve $v^2$ has an oscillatory circuit (consisting of an inductance $i^2$ in parallel with a condenser $c^2$) connected in the plate circuit thereof. Between the two valves is a third oscillatory circuit (consisting of an inductance $i^{12}$ in parallel with a condenser $c^{12}$), said circuit being connected in the plate circuit of the valve $v^1$ and the grid circuit of the valve $v^2$. This third oscillatory circuit is of course not connected directly to the filament circuit of the valves and, in accordance with the usual practice a high resistance $r$ is connected between the grid and filament of the valve $v^2$ and a capacity $p$ between the grid of said valve and said third oscillatory circuit.

In this case there are three auxiliary inductances $a^1$, $a^2$ and $a^3$ coupled respectively to the inductances $i^1$, $i^{12}$ and $i^2$. The inductances $a^1$ and $a^2$ are connected in a closed circuit with a condenser $c^6$ and the inductances $a^2$ and $a^3$ are connected in a closed circuit with a condenser $c^7$. This arrangement might obviously however be similar to that of Fig. 2. That is to say two condensers might be connected in each of the closed circuits alternately with the auxiliary inductances.

The values of the capacities and inductances are calculable in the same way as in the case of Figs. 1 and 2, the two valves being considered separately.

Obviously multi-stage amplifiers comprising any number of valves greater than two may be arranged in a manner analogous to the arrangement illustrated in Fig. 2.

Preferably in each of the three above described embodiments the auxiliary inductances are conductively connected to an "earthy" point of the amplifier, one point of the circuit comprising them being connected to the filament circuit.

It will be clear that the present invention may be used in one amplifier in combination with the invention claimed in my copending application Serial No. 144,553 of even date herewith so that both the capacitative and the magnetic coupling between the elements of the amplifier may be neutralized.

For example this combination will be effected by connecting an inductance in shunt with the condenser $c^3$ of Figure 1, or by connecting respective impedances in shunt with the capacities $c^6$ and $c^7$ of Figure 3.

It has been found in some cases that although electrostatic coupling has been neutralized between adjacent stage the instrument is still not stable owing to coupling between remote stages. In such cases, an auxiliary neutralizing circuit such as described above for neutralizing the coupling between adjacent stages may be used for neutralizing any such capacity coupling between stages not adjacent which may have capacity coupling between them.

What I claim and desire to secure by Letters Patent is:—

1. In a thermionic valve amplifier comprising inductances respectively connected in plate and grid circuits and in which capacitative coupling exists between certain of the amplifier elements, means for neutralizing said capacitative coupling, said means comprising auxiliary inductances and a condenser connected in a closed circuit said auxiliary inductances being electromagnetically coupled respectively to said plate and grid circuit inductances.

2. In a thermionic valve amplifier comprising inductances respectively connected in plate and grid circuits and in which capacitative coupling exists between certain of the amplifier elements, means for neutralizing said capacitative coupling, said means comprising auxiliary inductances and a condenser connected in a closed circuit a point of which is connected to an "earth" point, of said auxiliary inductances being electromagnetically coupled respectively to said plate and grid circuit inductances.

3. In a multi-stage amplifier comprising two valves, an inductance connected to the grid of the first valve, an inductance connected to the plate of the second valve and an inductance connected both to the plate of the first valve and the grid of the second valve, and in which capacitative coupling exists between certain of the elements of the amplifier, means for neutralizing said capacitative coupling said means comprising three auxiliary inductances each connected in a closed circuit with the next and condensers connected respectively in said closed circuits, said auxiliary inductances being respectively coupled to said former inductances.

4. In a multi-stage amplifier comprising two valves, an inductance connected to the grid of the first valve, an inductance connected to the plate of the second valve and an inductance connected both to the plate of the first valve and the grid of the second valve, and in which capacitative coupling exists between certain of the elements of the amplifier, means for neutralizing said capacitative coupling, said means comprising three auxiliary inductances each connected in a closed circuit with the next and condensers connected respectively in said closed circuits, said auxiliary inductances being respectively coupled to said former inductances and said closed circuits being each connected to an "earthy" point.

In witness whereof I affix my signature.

PETER WILLIAM WILLANS.